Figure 1:
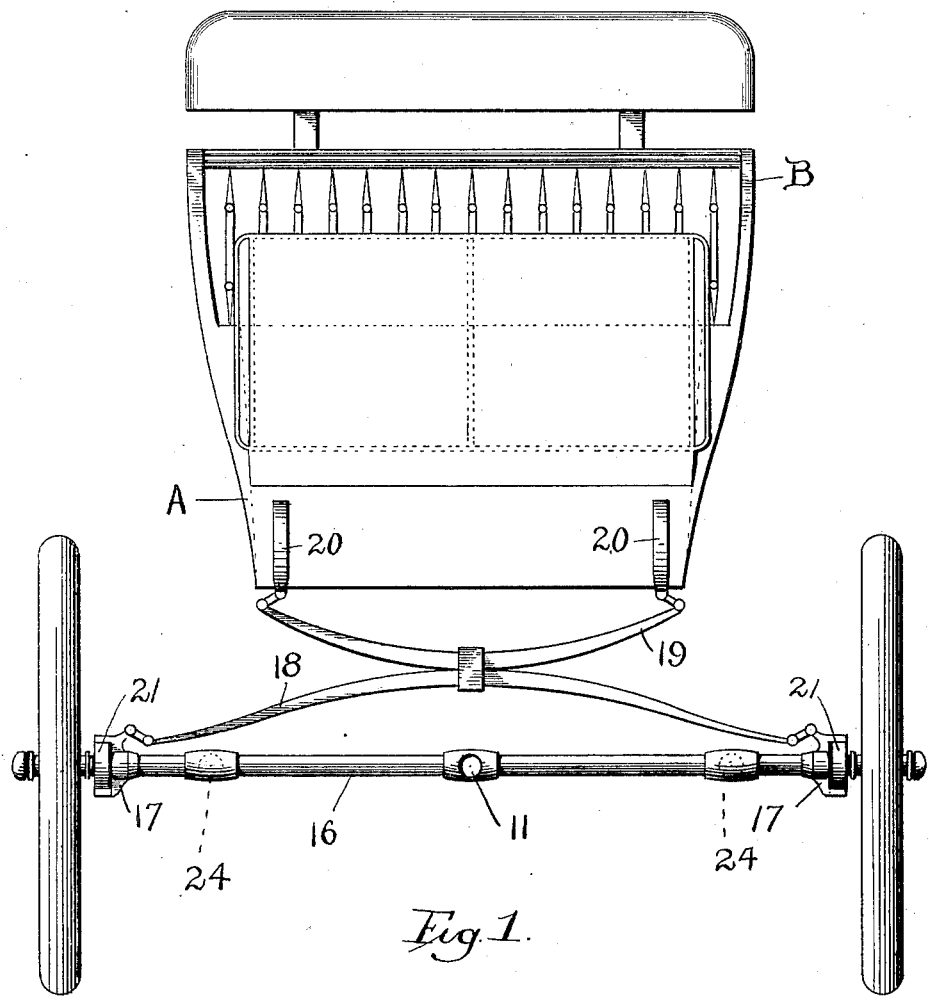

No. 688,257. Patented Dec. 3, 1901.
R. L. MORGAN.
RUNNING GEAR FOR MOTOR VEHICLES.
(Application filed Nov. 4, 1899.)

(No Model.) 3 Sheets—Sheet 1.

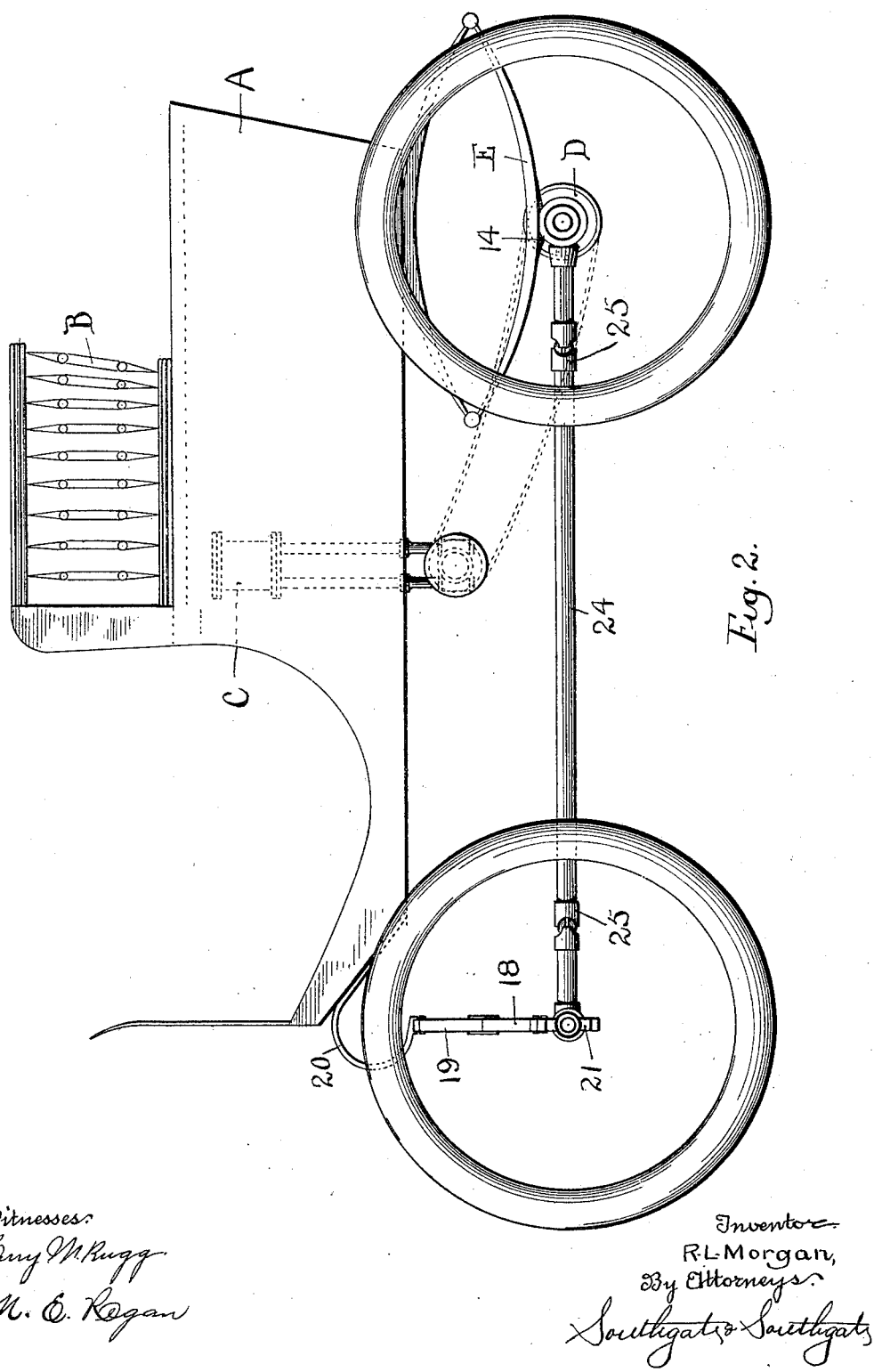

No. 688,257. Patented Dec. 3, 1901.
R. L. MORGAN.
RUNNING GEAR FOR MOTOR VEHICLES.
(Application filed Nov. 4, 1899.)
(No Model.) 3 Sheets—Sheet 3.
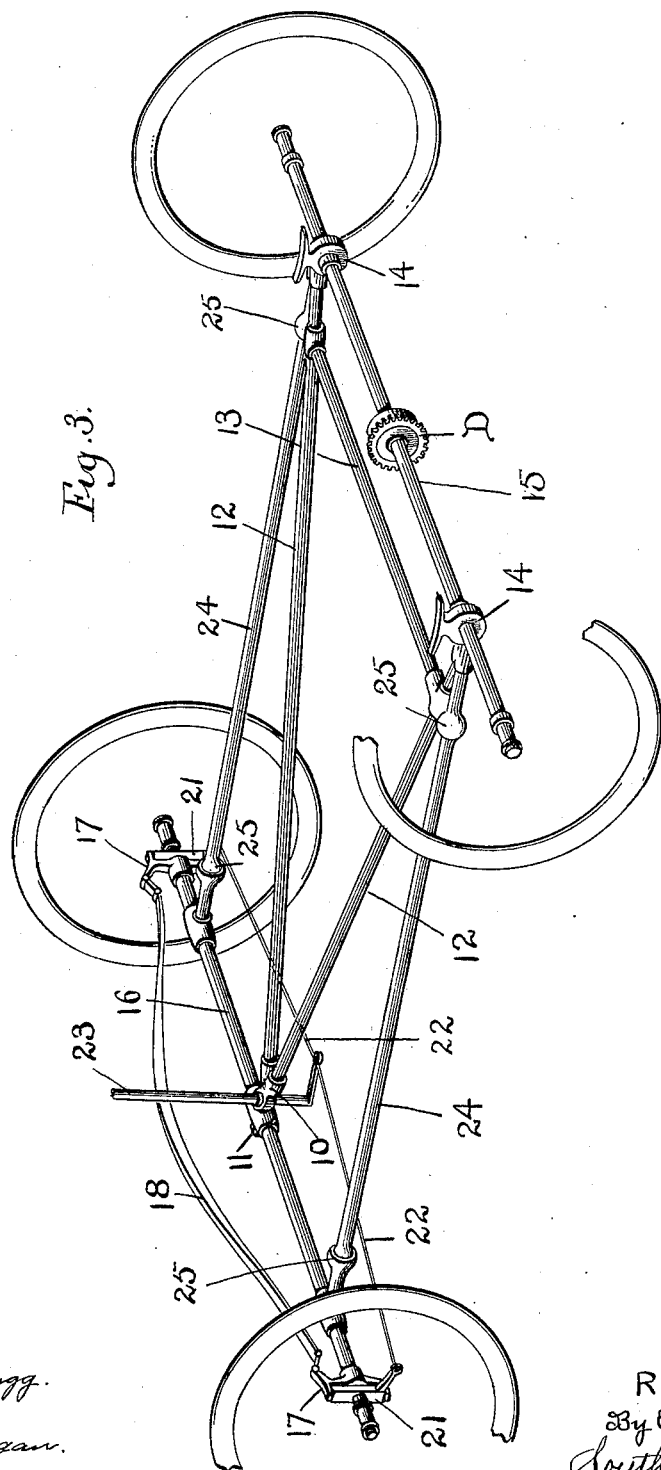

UNITED STATES PATENT OFFICE.

RALPH L. MORGAN, OF WORCESTER, MASSACHUSETTS, ASSIGNOR TO CHARLES R. FLINT, OF NEW YORK, N. Y.

RUNNING-GEAR FOR MOTOR-VEHICLES.

SPECIFICATION forming part of Letters Patent No. 688,257, dated December 3, 1901.

Application filed November 4, 1899. Serial No. 735,733. (No model.)

*To all whom it may concern:*

Be it known that I, RALPH L. MORGAN, a citizen of the United States, residing at Worcester, in the county of Worcester and State of Massachusetts, have invented a new and useful Running-Gear for Motor-Vehicles, of which the following is a specification.

This invention relates to a running-gear for vehicles which has been especially designed for use in automobiles or other power-driven vehicles in which the driving power is applied to the rear axle.

The object of this invention is to provide a simple durable form of running-gear which may be readily and cheaply constructed from tubing and which is so joined together that it will not be racked or strained when the vehicle is passing over uneven surfaces and which will not transmit so much jar or vibration to the body of the vehicle as the present forms of running-gear which are now employed.

To these ends this invention consists of the parts and combinations of parts, as hereinafter described, and more particularly pointed out in the claims at the end of this specification.

In the accompanying three sheets of drawings, Figure 1 is a front view of a vehicle provided with a running-gear constructed according to this invention. Fig. 2 is a side view of the same, and Fig. 3 is a partially-broken-away perspective view of the running-gear.

In constructing the running-gear which has heretofore ordinarily been employed for automobiles and similar power vehicles to which power is applied to the rear axle it has usually been customary to connect the front and rear axles rigidly together—that is to say, the connection between the front and rear axle of an ordinary automobile has usually been rigid, and in passing over uneven ground the flexibility or spring of the side rods or bars of a rear-driven vehicle of this character has alone been relied upon to compensate for the unevenness of the ground over which the vehicle may be driven. This in practice has been found to place a heavy strain on the running-gear of an automobile, and in some instances the side bars of the running-gear have speedily become broken or weakened. To overcome these objections, the especial object of the present invention is to provide a running-gear for rear-driven vehicles in which the thrust-bars which connect the rear and front axles are jointed or made flexible and to combine the thrust-bars with a frame connecting the front and rear axles in such a manner that the front axle will be free to turn upon a transverse central horizontal axis, but the plane of the different positions to which the front axle may be turned will be kept parallel to the rear axle. The joints for rendering the thrust-bars flexible may be of any of the ordinary ball-and-socket forms, or any other form of connection which permits a universal motion.

Referring to the drawings and in detail, A designates the vehicle-body, B the seat thereof, and C a motor mounted in the vehicle-body and connected by sprocket-chain in the ordinary manner to drive a sprocket-wheel D. These parts may be of the ordinary or approved construction and need not be herein described at length.

The running-gear which supports the vehicle-body is most clearly illustrated in Fig. 3. As shown in this figure, the running-gear comprises a Y-piece or yoke 10, having a forwardly-extending stud 11, upon which the front axle 16 is pivoted, so that the same may turn or swing thereon. Extending from the rear of the yoke-piece 10 are the side legs 12, which are connected by a cross-piece 13 to form a frame of substantially A shape. Secured on the ends of the side legs 12 of the frame are hangers or pieces 14. Journaled in the hangers 14 and preferably on ball-bearings in the ordinary manner is the rear axle 15, and supported by the hangers 14 are the rear springs E, supporting the rear end of the vehicle-body, as shown most clearly in Fig. 2. The front axle 16 is provided at its ends with brackets or hangers 17, which carry the lower section 18 of the front vehicle-spring. Supported by the lower section 18 is an upper spring-section 19, connected to hangers 20 of the vehicle-body, as shown most clearly in Figs. 1 and 2. Pivotally mounted in the hangers or brackets 17 are pieces 21, journaled on which, preferably by means of ball-bearings, are the front wheels. The steering connections for turning or setting the front wheels at the desired angle, as herein illustrated, comprise a vertical shaft 23, journaled in the Y-piece or yoke 10. The vertical shaft 23 is provided with a rearwardly-extending arm, which is connected by rods 22 to arms extending from the pieces 21. The steering-handle of the vehicle may be directly connected to the upper end of the shaft 23 or may be connected to actuate said shaft 23 through intermediate connections, some form of intermediate connecting mechanism being preferably employed to prevent vibrations from being transmitted directly to the steering-handle.

The driving connections from the rear axle to the front axle are arranged so as not to interfere with the freedom of the front axle to turn to different relative positions in a vertical plane parallel with the rear axle. As herein illustrated, these connections comprise thrust-rods 24, connected at their rear ends to the hangers 14 and at their front ends to the axle 16, said thrust-rods 24 being each preferably provided with a plurality of universal joints 25. The universal joints in the thrust-rods 24 may be of the ordinary ball-and-socket form, as shown in Fig. 3, although in practice the joints of the thrust-rods 24 are preferably of the form illustrated in Fig. 2.

In using a vehicle provided with a running-gear constructed in this manner driving pressure will be transmitted from the rear axle through the jointed thrust-rods 24, while at the same time the jointed thrust-rods will not interfere with the free swiveling or turning of the front axle in a vertical plane parallel with the rear axle. For example, let it be supposed that a vehicle employing a running-gear of this construction is traveling over level ground. While the ground remains level the front and rear axles will be kept parallel with each other and the thrust-rods 24 will act in the same manner as the rigid side bars of the ordinary running-gear of vehicles of this character. Suppose now that one of the front wheels should run into a gully or depression. If this is allowed to happen with the ordinary rigid or fixed form of running-gear, a heavy strain is placed upon the rigid connections, and these connections are bent or flexed to such an extent that they are frequently broken or weakened; but in using a running-gear of the form herein shown if a front wheel should be allowed to run into a gully or depression the front wheel will be free to turn about its pivot on the shaft or stud 11, the jointed thrust-rod 24 permitting this to take place by simply drawing or pulling the front axle back a short distance upon its center stud. In other words, in passing over obstructions or uneven surfaces the distance between the front and rear wheels will vary slightly by the use of a running-gear as thus constructed; but there will be no unnecessary strain or bending of the connections forming the running-gear, and on account of its flexibility there will be less vibration and jar transmitted to the vehicle-body than in constructions which have heretofore been employed.

Various changes may be made in the arrangement and proportions of the parts of a running-gear constructed according to this invention by those who are skilled in the art without departing from the scope of the invention as expressed in the claims. It is not desired, therefore, to be limited to the construction which is herein illustrated and described; but

What is claimed, and sought to be secured by Letters Patent of the United States, is—

1. In a vehicle, the combination of a frame, a front axle transversely pivoted thereto so as to be free to turn upon a transverse central horizontal axis, and side bars or thrust-rods extending from the front to the rear axle, and arranged so as not to interfere with the turning of the front axle on its central horizontal transverse pivot, substantially as described.

2. In a vehicle, the combination of a driven rear axle, a front axle, jointed thrust-rods extending from the front to the rear axle, and a frame having a pivoted connection with the front axle, permitting said front axle to turn to different positions in a vertical plane parallel with the rear axle, substantially as described.

3. In a vehicle, the combination of an A-shaped frame, a driven rear axle journaled in hangers at the ends of the side legs of the A-frame, a front axle journaled on a stud extending from the apex of the A-frame, and jointed thrust-rods connecting the front and rear axles, substantially as described.

4. In a vehicle, the combination of an A-frame, a driven rear axle journaled in hangers at the ends of the side legs of the A-frame, a front axle pivoted on a stud extending from the apex of the A-frame, movable pieces pivotally mounted in brackets at the end of the front axle on which the front wheels are journaled, and steering connections mounted in the A-frame for turning said movable pieces, substantially as described.

5. In a vehicle, the combination of an A-frame comprising a yoke-piece, side legs extending therefrom, a cross-piece connecting said side legs, a driven rear axle journaled in hangers supported at the ends of the side legs of the A-frame, a front axle pivoted on a stud extending from the yoke-piece, side bars connecting the front and rear axles, each of said side bars having a universal joint near each end thereof, a vertical steering-shaft in the yoke-piece of the A-frame, and connections from the steering-shaft to movable pieces supporting the front wheels at opposite ends of the front axle, substantially as described.

6. In a vehicle, the combination of an A-frame comprising a yoke-piece 10 having an extending horizontal stud 11, side legs 12 extending back from the yoke-piece, and a cross-bar 13 connecting said side legs, hangers 14 secured at the ends of the side legs 12, springs mounted on the hangers 14 for supporting the rear end of the vehicle-body, a driven rear axle 15 journaled in the hangers 14, a front axle 16 pivoted on the stud 11, brackets 17 secured on the ends of the front axle 16, a transverse spring connected to said brackets for supporting the front end of the vehicle-body, a steering-shaft 23 journaled in the yoke-piece 10, and connections from the steering-shaft 23 to pieces which are pivoted in the brackets 17 and carry the front wheels, substantially as described.

In testimony whereof I have hereunto set my hand in the presence of two subscribing witnesses.

RALPH L. MORGAN.

Witnesses:
LOUIS W. SOUTHGATE,
PHILIP W. SOUTHGATE.